(12) United States Patent
Nakao

(10) Patent No.: US 9,059,588 B2
(45) Date of Patent: Jun. 16, 2015

(54) BALANCE CORRECTING APPARATUS, ELECTRICITY STORAGE SYSTEM, AND TRANSPORTATION DEVICE

(71) Applicant: EVTD Inc., Tokyo (JP)

(72) Inventor: Fumiaki Nakao, Shizuoka (JP)

(73) Assignee: EVTD Inc., Tokyo (JP)

( * ) Notice: Subject to any disclaimer, the term of this patent is extended or adjusted under 35 U.S.C. 154(b) by 0 days.

(21) Appl. No.: 14/016,247

(22) Filed: Sep. 3, 2013

(65) Prior Publication Data

US 2013/0342156 A1 Dec. 26, 2013

Related U.S. Application Data

(63) Continuation of application No. PCT/JP2012/001538, filed on Mar. 6, 2012.

(30) Foreign Application Priority Data

Mar. 11, 2011 (JP) ................................. 2011-054693

(51) Int. Cl.
| | | |
|---|---|---|
| *H02J 7/14* | (2006.01) | |
| *H02J 7/00* | (2006.01) | |
| *B60L 11/18* | (2006.01) | |
| *H01M 10/42* | (2006.01) | |
| *B60L 7/16* | (2006.01) | |

(52) U.S. Cl.
CPC ............. *H02J 7/0014* (2013.01); *H02J 7/0016* (2013.01); *Y02T 10/7055* (2013.01); *B60L 11/1866* (2013.01); *H01M 10/42* (2013.01); *B60L 7/16* (2013.01); *B60L 2200/26* (2013.01); *Y02T 10/7005* (2013.01); *Y02T 10/7061* (2013.01)

(58) Field of Classification Search
USPC .................................................. 320/119, 104
See application file for complete search history.

(56) References Cited

U.S. PATENT DOCUMENTS

| | | | | |
|---|---|---|---|---|
| 2006/0232240 | A1* | 10/2006 | Salasoo et al. ................. | 320/119 |
| 2010/0253286 | A1* | 10/2010 | Sutardja ........................ | 320/118 |

FOREIGN PATENT DOCUMENTS

| | | | |
|---|---|---|---|
| JP | 2002-199602 A | 7/2002 | |
| JP | 2006-067742 A | 3/2006 | |

(Continued)

OTHER PUBLICATIONS

International Preliminary Search Report for International Patent Application No. PCT/JP2012/001538, issued by the International Bureau of WIPO on Sep. 26, 2013.
International Search Report for International Application No. PCT/JP2012/001538, issued by the Japanese Patent Office on Jun. 5, 2012.

(Continued)

*Primary Examiner* — Edward Tso
*Assistant Examiner* — Robert Grant

(57) ABSTRACT

A balance correcting circuit is prevented from moving charges from a low-voltage electricity storage cell to a high-voltage electricity storage cell in a electricity storage system. The balance correcting circuit includes an inductor, a first switching device, a second switching device, and a control signal generating unit that supplies a control signal to the first and second switching devices to turn on and off the first and second switching devices so that the first switching device and the second switching device are alternately turned on and off. The control signal generating unit stops generating the control signal when receiving a state transition signal indicating that the electricity storage system transitions to and temporarily stays in a charging state while the electricity storage system is operating.

9 Claims, 5 Drawing Sheets

(56) References Cited

FOREIGN PATENT DOCUMENTS

| JP | 2008-017605 A | 1/2008 |
| JP | 2009-131060 A | 6/2009 |
| JP | 2009-232660 A | 10/2009 |
| WO | 2007-148745 A1 | 12/2007 |

OTHER PUBLICATIONS

Extended European Search Report for European Patent Application No. 12 757 681.7, issued by the European Patent Office on Aug. 28, 2014.

Office Action issued for counterpart Japanese Application 2011-054693, issued by the Japanese Patent Office on Mar. 24, 2015.

* cited by examiner

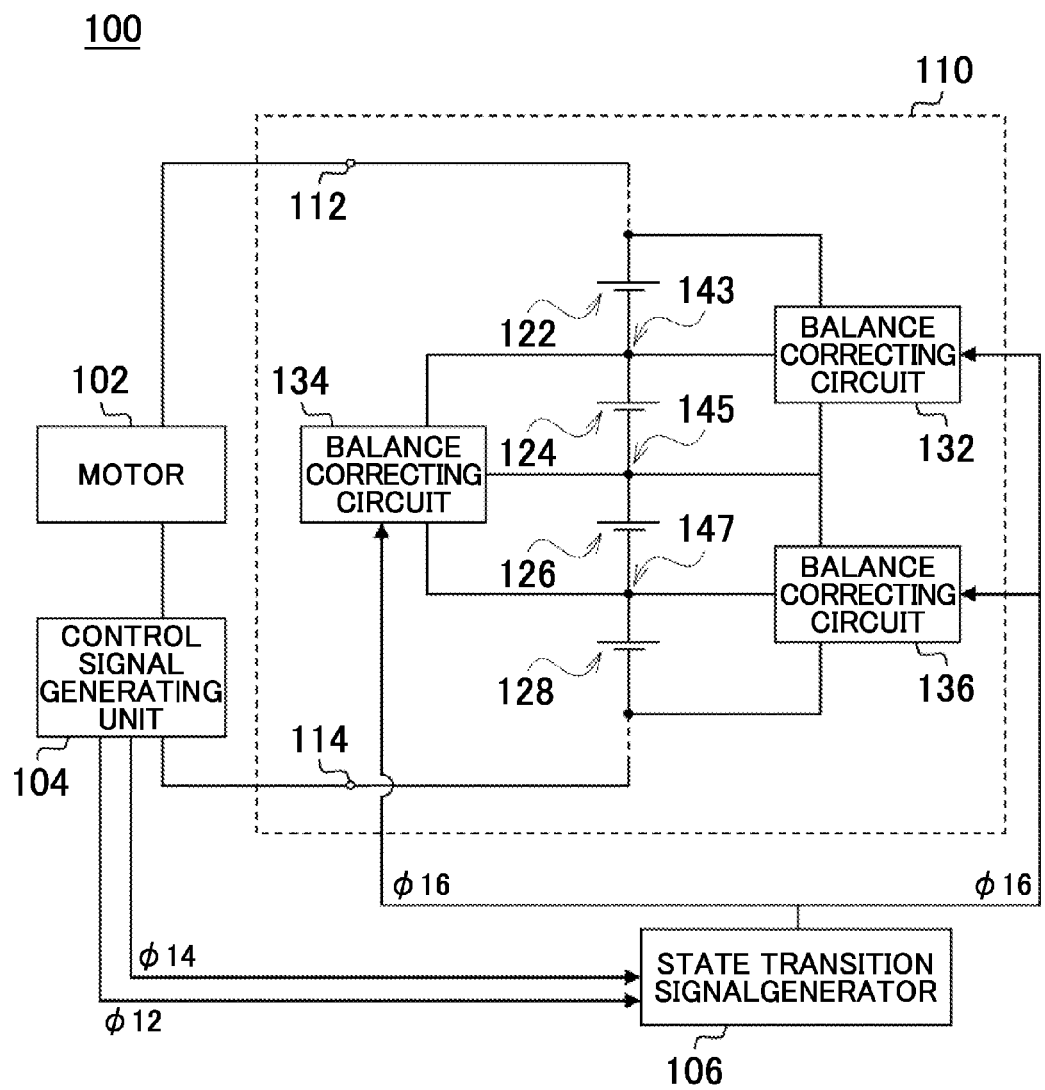
F I G. 1

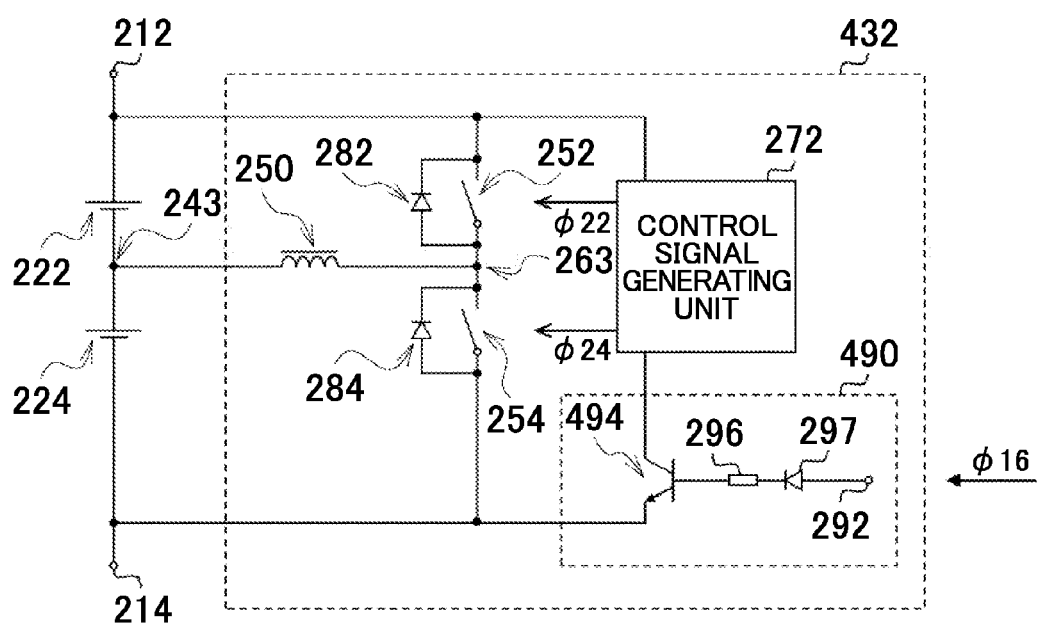
F I G . 4

BALANCE CORRECTING APPARATUS, ELECTRICITY STORAGE SYSTEM, AND TRANSPORTATION DEVICE

CROSS REFERENCE TO RELATED APPLICATION

The contents of the following Japanese patent application and PCT patent application are incorporated herein by reference:
No. 2011-054693 filed on Mar. 11, 2011, and,
No. PCT/JP2012/001538 filed on Mar. 6, 2012.

BACKGROUND

1. Technical Field

The present invention relates to a balance correcting apparatus and a electricity storage system.

2. Related Art

When a large number of electricity storage cells connected in series are used, unevenness among the voltages of the electricity storage cells may shorten the lifetime of the electricity storage cells. To address this issue, a balance correcting circuit has been proposed that includes an inductor, a switching device and a driver circuit for the switching device and that equalizes voltages of the electricity storage cells (see Patent Documents 1 to 3).

PRIOR ART DOCUMENTS

Patent Document 1: Japanese Patent Application Publication No. 2006-067742
Patent Document 2: Japanese Patent Application Publication No. 2008-017605
Patent Document 3: Japanese Patent Application Publication No. 2009-232660

A balance correcting circuit is designed to equalizes voltages of a plurality of electricity storage cells by moving electric charges from a electricity storage cell with a high voltage to a electricity storage cell with a low voltage. The inventors, however, have found that there may be a case where the balance correcting circuit moves electric charges from a low-voltage electricity storage cell to a high-voltage electricity storage cell. When electric charges are moved from the low-voltage electricity storage cell to the high-voltage electricity storage cell, it may take longer to equalize voltages of the electricity storage cells. Therefore, one objective of the present invention is to provide a balance correcting apparatus and a electricity storage system that can solve the above-described problems. This objective is accomplished by combinations of the features recited in the independent claims. The dependent claims define further advantageous specific examples of the present invention.

SUMMARY

A first aspect of the innovations may include a balance correcting apparatus that equalizes voltages of a first electricity storage cell and a second electricity storage cell that are connected in series in a electricity storage system. The balance correcting apparatus includes an inductor having one end that is electrically connected to a connection point between one end of the first electricity storage cell and one end of the second electricity storage cell, a first switching device that is electrically connected between the other end of the inductor and the other end of the first electricity storage cell, a second switching device that is electrically connected between the other end of the inductor and the other end of the second electricity storage cell, and a control signal generating unit that supplies, to the first switching device and the second switching device, a control signal for controlling an ON-OFF operation of the first switching device and the second switching device to allow the first switching device and the second switching device to perform an ON-OFF operation alternately. Here, the control signal generating unit stops generating the control signal when receiving a state transition signal indicating that the electricity storage system transitions to and temporarily stays in a charging state while the electricity storage system is operating.

The balance correcting apparatus may include a third switching device that is electrically connected between the other end of the first electricity storage cell or the other end of the second electricity storage cell and the control signal generating unit, where the third switching device limits power supply to the control signal generating unit in accordance with the state transition signal.

In the balance correcting apparatus, the third switching device may be a bipolar junction transistor. The balance correcting apparatus may further include a state transition signal input terminal that receives the state transition signal, a first resistance element that is electrically connected between a base of the bipolar junction transistor and the state transition signal input terminal, and a second resistance element having one end that is electrically connected between the base of the bipolar junction transistor and the first resistance element and the other end that is electrically connected between the other end of the first electricity storage cell or the other end of the second electricity storage cell and the third switching device.

A second aspect of the innovations may include a electricity storage system including a first electricity storage cell and a second electricity storage cell that are connected in series, and the above-described balance correcting apparatus, where the balance correcting apparatus equalizes voltages of the first electricity storage cell and the second storage cell.

A third aspect of the innovations may include a transportation device including the above-described electricity storage system, a motor that is electrically connected to the electricity storage system, where the motor converts at least one of kinetic energy of the transportation device and a potential energy of the transportation device into electric energy when the transportation device is applied with a brake, a braking signal generator that generates a braking signal indicating that the transportation device is to be applied with a brake or that the transportation device is being applied with a brake, and a state transition signal generator that notifies the state transition signal to the balance correcting apparatus when receiving the braking signal.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 1 schematically illustrates an example of an apparatus 100 including a electricity storage system 110.

FIG. 4 schematically illustrates an example of a electricity storage system 410.

DESCRIPTION OF EXEMPLARY EMBODIMENTS

Figure 2:
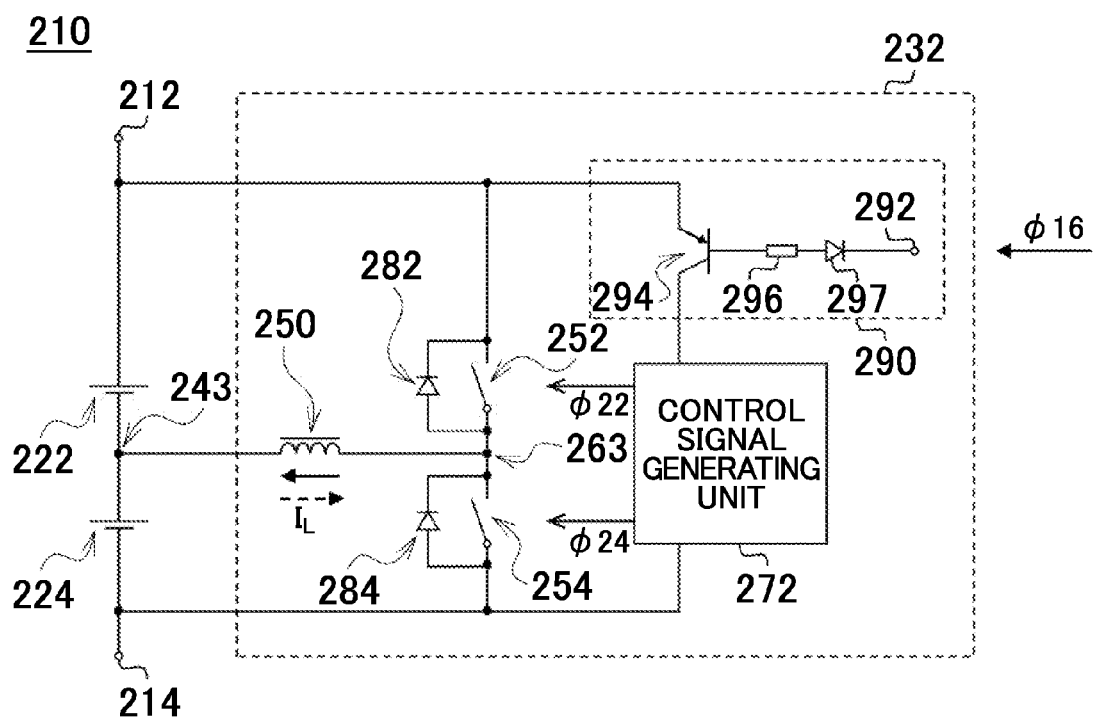
FIG. 2 schematically illustrates an example of a electricity storage system 210.

Hereinafter, some embodiments of the present invention will be described. The embodiments do not limit the invention according to the claims, and all the combinations of the features described in the embodiments are not necessarily essential to means provided by aspects of the invention. When the embodiments are described with reference to the attached drawings, identical or similar constituents may be assigned with identical reference numerals in the drawings and not repeatedly explained.

FIG. 1 schematically illustrates one example of an apparatus 100 including a electricity storage system 110. The apparatus 100 includes a motor 102, a braking signal generator 104, a state transition signal generator 106, and the electricity storage system 110. The apparatus 100 may be a transportation device such as an electric vehicle, a hybrid vehicle, an electric two-wheel vehicle, a rail vehicle, and a lift. The apparatus 100 may be an electric device such as a personal computer and a mobile phone.

The electricity storage system 110 includes a terminal 112, a terminal 114, a plurality of electricity storage cells that are connected in series and include a electricity storage cell 122, a electricity storage cell 124, a electricity storage cell 126, and a electricity storage cell 128, and a plurality of balance correcting circuits including a balance correcting circuit 132, a balance correcting circuit 134, and a balance correcting circuit 136. The balance correcting circuits 132, 134 and 136 may be an exemplary balance correcting apparatus.

The meaning of the expression "to electrically connect" is not limited to direct connection between a given component and another component. There may be a third component between the components. Furthermore, the meaning is not limited to physical connection between the components. For example, in a transformer, an input winding and an output winding are not physically connected but electrically connected. The expression "to connect a given component to another component" covers not only a case where the given component is actually electrically connected to the other component but also a case where the given component becomes electrically connected to the other component when a electricity storage cell is electrically connected to a balance correcting circuit. Furthermore, the expression "to connect a given component and another component in series" means that the components are electrically connected in series.

The motor 102 is electrically connected to the electricity storage system 110 and uses the power supplied from the electricity storage system 110. The motor 102 may be an exemplary electric load. The motor 102 may be used as a regenerative brake. The motor 102 may convert at least one of the kinetic energy of the apparatus 100 and the potential energy of the apparatus 100 into electric energy, when the apparatus 100 is applied with a brake.

The braking signal generator 104 may generate a brake signal φ12 that instructs a brake to be applied to the apparatus 100. The braking signal generator 104 may generate the brake signal φ12 when detecting a braking operation by a user or the like. The braking signal generator 104 may generate the brake signal φ12 when detecting that an operation to cause the motor 102 to generate a driving force is ended. When the apparatus 100 is a vehicle such as an electric vehicle, the operation to cause the motor 102 to generate a driving force may be an accelerating operation. When detecting that a user has partly or entirely released the accelerator, the braking signal generator 104 may generate the brake signal φ12.

The braking signal generator 104 may generate a regeneration signal φ14 that indicates that the apparatus 100 is being applied with a brake. The braking signal generator 104 may be electrically connected to the motor 102 and be configured to detect a current flowing through the motor 102. The braking signal generator 104 may generate the regeneration signal φ14 when detecting that the motor 102 is generating a regeneration current.

The braking signal generator 104 may notify at least one of the brake signal φ12 and the regeneration signal φ14 to at least one of the balance correcting circuits 132, 134 and 136. The brake signal φ12 and the regeneration signal φ14 may be exemplary braking signals.

The state transition signal generator 106 receives at least one of the brake signal φ12 and the regeneration signal φ14 generated by the braking signal generator 104. The state transition signal generator 106 notifies a state transition signal φ16 to at least one of the balance correcting circuits 132, 134 and 136 when receiving at least one of the brake signal φ12 and the regeneration signal φ14.

The state transition signal φ16 may indicate that the electricity storage system 110 transitions to and temporarily remains in a charging state while the electricity storage system 110 is operating. The state transition signal φ16 may indicate that the motor 102 is currently generating a regeneration current or may possibly be to generate a regeneration current. The recitation that "the state transition signal φ16 may indicate that the electricity storage system 110 transitions to and temporarily remains in a charging state" may indicate not only a case where the electricity storage system 110 is going to transition to the charging state but also a case where the electricity storage system 110 has already entered the charging state. Referring to the recitation "the electricity storage system 110 is going to transition to the charging state," it does not matter whether the electricity storage system 110 actually subsequently transitions to the charging state.

The electricity storage system 110 may be in one of a discharging state in which the electricity storage system 110 supplies power to the motor 102, a charging state in which the electricity storage system 110 stores therein electric energy, a standby state in which neither charging nor discharging occurs while the apparatus 100 is operating and a non-operational state that results from turning off the apparatus 100 or stopping the power supply to the motor 102. The recitation that the electricity storage system 110 is operating means that the electricity storage system 110 is in one of the states other than the non-operational state. When the electricity storage system 110 is in one of the discharging state, charging state and standby state, the electricity storage system 110 may be considered to be operating.

The electricity storage system 110 may transition to the non-operational state after an operation is performed to stop the power supply to the motor 102 or to turn off the apparatus 100 and a predetermined condition is satisfied. The operation to stop the power supply the motor 102 or to turn off the apparatus 100 may be an operation to turn off an ignition switch. The predetermined condition may be an elapse of a predetermined period of time after the above operation is performed. The predetermined condition may be such a condition that the difference in voltage between adjacent electricity storage cells is smaller than a predetermined value.

For example, the motor 102 generates a regeneration current if the user performs a braking operation while the motor 102 is driving the electric vehicle using the power supplied from the electricity storage system 110. If the user subsequently performs an accelerating operation, the motor 102 uses the power supplied from the electricity storage system 110 to resume driving the electric vehicle.

As described above, while the regeneration current is generated, the electricity storage system 110 is switched from the discharging state and temporarily stays in the charging state even though the electricity storage system 110 is operating. In this case, the state transition signal generator 106 may notify the state transition signal φ16 to at least one of the balance correcting circuits 132, 134 and 136.

On the other hand, when an external charging device is electrically connected to the electricity storage system 110 to charge the electricity storage system 110, the electricity storage system 110 transitions to the charging state while being in the non-operational state. Accordingly, in this case, the state transition signal generator 106 may not need to notify the state transition signal φ16 to at least one of the balance correcting circuits 132, 134 and 136.

The state transition signal φ16 may indicate that the electricity storage system 110 may transition to and temporarily stays in the charging state while at least one of the balance correcting circuits 132, 134 and 136 is operating. In this case, the balance correcting circuits 132, 134 and 136 may each preferably deactivate its balance correction capability if the difference in voltage between the electricity storage cells to be corrected is smaller than a predetermined value.

The state transition signal generator 106 may generate the state transition signal φ16 based on the received signal. The state transition signal generator 106 may store therein a signal generation condition in which the received signal is associated with whether to generate or stop generating the state transition signal φ16. The state transition signal generator 106 may determine whether to generate or stop generating the state transition signal φ16 based on the received signal and the signal generation condition.

The state transition signal generator 106 may generate the state transition signal φ16 when receiving at least one of the brake signal φ12 and the regeneration signal φ14. In this way, the state transition signal generator 106 can generate the state transition signal φ16 before the motor 102 generates the regeneration current. Furthermore, when the motor 102 has already started generating the regeneration current, the state transition signal generator 106 can reliably generate the state transition signal φ16. This condition may be an example of the signal generation condition.

For example, while the apparatus 100, for example, an electric vehicle remains stopped for a red light, the motor 102 does not generate the regeneration current even if the user steps on the brake pedal. Therefore, the state transition signal generator 106 may not need to generate the state transition signal φ16 even when receiving the brake signal φ12, if the speed and acceleration of the apparatus 100 are smaller than a predetermined value. The state transition signal generator 106 may obtain signals indicative of the speed and acceleration of the apparatus 100 from a speed detector and an acceleration detector, which are not shown. The state transition signal generator 106 may not need to generate the state transition signal φ16 when the difference in voltage between adjacent electricity storage cells is smaller than a predetermined value. This condition may be an example of the signal generation condition.

The state transition signal generator 106 may stop generating the state transition signal φ16 when not receiving the regeneration signal φ14 after a predetermined period of time has elapsed after receiving the brake signal φ12. The state transition signal generator 106 may stop generating the state transition signal 916 when the value of the regeneration current is smaller than a predetermined value. The state transition signal generator 106 may stop generating the state transition signal φ16 when receiving a signal indicative of that the electricity storage system 110 transitions to the discharging state. The state transition signal generator 106 may stop generating the state transition signal φ16 when receiving a signal that stops at least one of the apparatus 100 and the electricity storage system 110. This condition may be an example of the signal generation condition.

In the present embodiment, the apparatus 100 includes the state transition signal generator 106 and the state transition signal φ16 is notified from the state transition signal generator 106 to the electricity storage system 110. However, the state transition signal is not limited to such.

The braking signal generator 104 may notify at least one of the brake signal φ12 and the regeneration signal φ14 to at least one of the balance correcting circuits 132, 134 and 136. In this case, the braking signal generator 104 may be an example of the state transition signal generator 106. The brake signal φ12 and the regeneration signal φ14 may be an example of the state transition signal φ16. Furthermore, a signal to detect whether a user or the like performs a braking operation, a signal to detect whether the operation to cause the motor 102 to generate a driving force is ended, and a signal to detect whether the motor 102 is generating the regeneration current may be an exemplary braking signal.

The electricity storage system 110 is electrically connected to the motor 102 and supplies power to the motor 102. The electricity storage system 110 is electrically connected to a charging apparatus, which is not shown, and capable of storing electric energy.

The terminals 112 and 114 are used to electrically connect a device external to the electricity storage system 110 such as the charging device and the motor 102 to the electricity storage system 110. The electricity storage cells 122, 124, 126 and 128 are connected in series. The electricity storage cells 122, 124, 126 and 128 may be rechargeable batteries or capacitors. The electricity storage cells 122, 124, 126 and 128 may be lithium ion batteries or lithium polymer batteries. The electricity storage cells 122, 124, 126 and 128 may each include a plurality of electricity storage cells.

For example, when the electricity storage cells 122 and 124 are different from each other in terms of the product quality and degradation rate, the electricity storage cells 122 and 124 may have different battery characteristics. Here, the battery characteristics may be, for example, the battery capacity or the discharge-voltage characteristics indicating the relation between the discharge duration and the battery voltage. For example, as the electricity storage cells degrade, the battery voltages drop with a shorter discharge duration.

When the electricity storage cells 122 and 124 have different battery characteristics, the voltages of the electricity storage cells 122 and 124 resultantly differ from each other as the electricity storage system 110 is progressively discharged even if the electricity storage cells 122 and 124 have substantially the same voltages at the completion of the charging of the electricity storage system 110. Furthermore, even if the electricity storage cells 122 and 124 have substantially the same voltages at the start of the charging of the electricity storage system 110, the voltages of the electricity storage cells 122 and 124 resultantly differ from each other as the electricity storage system 110 is progressively charged.

Since the electricity storage cells 122 and 124 have a predetermined range of available charge levels (may be referred to as "the state of charge (SOC)"), the unevenness in voltage between the electricity storage cells 122 and 124 may lower the efficiency of the electricity storage system 110. Therefore, the efficiency of the electricity storage system 110 can be improved by achieving equal voltages for the electricity storage cells 122 and 124.

The balance correcting circuit 132 includes an inductor and is designed to equalize voltages of the electricity storage cells 122 and 124. The balance correcting circuit 132 is electrically connected to an end of the electricity storage cell 122 that is connected to the terminal 112 (may be referred to as "the positive end") and to a connection point 143 between an end of the electricity storage cell 122 that is connected to the terminal 114 (may be referred to as "the negative end") and the positive end of the electricity storage cell 124. In this way, a circuit including the electricity storage cell 122 and the inductor is formed. The balance correcting circuit 132 is electrically connected to the connection point 143 and to a connection point 145 between the negative end of the electricity storage cell 124 and the positive end of the electricity storage cell 126. In this manner, a circuit including the electricity storage cell 124 and the inductor is formed.

The balance correcting circuit 132 alternately provides a current to the circuit including the inductor and the electricity storage cell 122 and to the circuit including the inductor and the electricity storage cell 124. This allows electric energy to be exchanged between the electricity storage cell 122 and the electricity storage cell 124 via the inductor. Accordingly, the voltages of the electricity storage cell 122 and the electricity storage cell 124 are equalized.

The inventors have found that a balance correcting apparatus may sometimes move electric charges from a low-voltage electricity storage cell to a high-voltage storage cell. Here, as a electricity storage cell degrades, the internal resistance of the electricity storage cell accordingly increases. Therefore, if a electricity storage system including a normal electricity storage cell and a degraded electricity storage cell having different voltages is charged with a balance correcting apparatus being operated, the voltage drop in the degraded electricity storage cell is thought to be larger than the voltage drop in the normal electricity storage cell depending on the value of the charging current.

Therefore, in the present embodiment, the balance correcting circuit 132 may stop operating when receiving the state transition signal φ16. This can prevent the balance correcting circuit 132 from moving charges from a low-voltage electricity storage cell to a high-voltage electricity storage cell.

The balance correcting circuit 134 equalizes the voltages of the electricity storage cells 124 and 126. The balance correcting circuit 134 is electrically connected to the connection point 143, to the connection point 145 and to a connection point 147 between the negative end of the electricity storage cell 126 and the positive end of the electricity storage cell 128. The balance correcting circuit 136 equalizes the voltages of the electricity storage cells 126 and 128. The balance correcting circuit 136 is electrically connected to the connection point 145, to the connection point 147 and to the negative end of the electricity storage cell 128. The balance correcting circuits 134 and 136 may have similar configurations as the balance correcting circuit 132.

FIG. 2 schematically illustrates an example of a electricity storage system 210. The electricity storage system 210 includes a terminal 212, a terminal 214, electricity storage cells 222 and 224 that are connected in series, and a balance correcting circuit 232. The balance correcting circuit 232 may be an exemplary balance correcting apparatus. The electricity storage cell 222 may be an exemplary first electricity storage cell. The electricity storage cell 224 may be an exemplary second electricity storage cell.

The terminals 212 and 214 may respectively have similar configurations as the terminals 112 and 114 of the electricity storage system 110. The electricity storage cells 222 and 224 may have similar configurations as the electricity storage cell 122, 124, 126 or 128. The electricity storage system 110 may have a similar configuration to the electricity storage system 210. The balance correcting circuits 132, 134 and 136 may have a similar configuration as the balance correcting circuit 232.

The balance correcting circuit 232 is configured to equalize the voltages of the electricity storage cells 222 and 224. The balance correcting circuit 232 includes an inductor 250, a switching device 252, a switching device 254, a control signal generating unit 272, a diode 282, a diode 284, and a control power on/off circuit 290. The switching device 252 may be an exemplary first switching device. The switching device 254 may be an exemplary second switching device.

The balance correcting circuit 232 is electrically connected to the positive end of the electricity storage cell 222 and to a connection point 243 between the negative end of the electricity storage cell 222 and the positive end of the electricity storage cell 224. In this manner, a first open/close circuit is formed that includes the electricity storage cell 222, the switching device 252, and the inductor 250. The balance correcting circuit 232 is electrically connected to the connection point 243 and to the negative end of the electricity storage cell 224. In this manner, a second open/close circuit is formed that includes the electricity storage cell 224, the inductor 250 and the switching device 254. The connection point 243 may be an exemplary connection point between one end of a first electricity storage cell and one end of a second electricity storage cell.

The inductor 250 is electrically connected at one end thereof to the connection point 243. The inductor 250 may be electrically connected at the other end thereof to the connection point 263 between the switching device 252 and the switching device 254. If the switching devices 252 and 254 are alternately and repeatedly turned on and off, an inductor current $I_L$ is generated in the inductor 250.

The switching device 252 is electrically connected between the other end of the inductor 250 and the positive end of the electricity storage cell 222. The switching device 252 receives a control signal φ22 from the control signal generating unit 272 and is turned on/off in accordance with the control signal φ22. In this manner, the first open/close circuit is opened or closed. The switching device 252 may be a MOSFET. The switching device 252 may remain turned off while not receiving the control signal φ22.

The switching device 254 is electrically connected between the other end of the inductor 250 and the negative end of the electricity storage cell 224. The switching device 254 receives a control signal φ24 from the control signal generating unit 272 and is turned on or off in accordance with the control signal φ24. In this manner, the second open/close circuit is opened or closed. The switching device 254 may be a MOSFET. The switching device 254 may remain turned off while not receiving the control signal φ24.

The control signal generating unit 272 generates the control signal φ22 to turn on/off the switching device 252 and the control signal φ24 to turn on/off the switching device 254. The control signal generating unit 272 supplies the control signal φ22 to the switching device 252. The control signal generating unit 272 supplies the control signal φ24 to the switching device 254.

The control signal generating unit 272 may generate the control signal φ22 and the control signal φ24 in such a manner that the switching devices 252 and 254 are alternately turned on and off. This can alternately turn on and off the switching devices 252 and 254. The control signals φ22 and φ24 may each be a square wave having a duty cycle of 50%. The duty cycle can be calculated as the ratio of the on period relative to the period of the square wave.

The control signal generating unit 272 may be a pulse generator that is capable of generating a sequence of pulses having a predetermined period. The control signal generating unit 272 may be a variable pulse generator that can control the variable duty cycle of at least one of the control signals φ22 and φ24. The control signal generating unit 272 may be formed in the same substrate as the switching device 252 and 254.

The control signal generating unit 272 may stop generating the control signals φ22 and φ24 when the balance correcting circuit 232 receives the state transition signal φ16. In this manner, the balance correcting circuit 232 can stop operating simply when the state transition signal generator 106 notifies the state transition signal φ16 to the electricity storage system 110 (210). Therefore, the balance correcting circuit 132 can be prevented from moving charges from a low-voltage electricity storage cell to a high-voltage electricity storage cell.

The control signal generating unit 272 may be electrically connected to the positive end of the electricity storage cell 222 and the negative end of the electricity storage cell 224. The control signal generating unit 272 may use the electricity storage cells 222 and 224 as a reference voltage source.

The diode 282 is arranged in parallel with the switching device 252 and passes a current from the other end of the inductor 250 to the positive end of the electricity storage cell 222. The diode 284 is arranged in parallel with the switching device 254 and passes a current from the negative end of the electricity storage cell 224 to the other end of the inductor 250. The diodes 282 and 284 may be parasitic diodes that are equivalently formed between the source and the drain of the MOSFET.

Even if the inductor current $I_L$ remains after both of the switching devices 252 and 254 are turned off, the existence of the diodes 282 and 284 allows the inductor current $I_L$ to continue to flow through the diodes 282 and 284. In this manner, once generated in the inductor 250, the inductor current IL can be prevented from being wasted. In addition, a surge voltage, which may occur when the inductor current $I_L$ is blocked, can be prevented.

The control power on/off circuit 290 is arranged between the positive end of the electricity storage cell 222 and the control signal generating unit 272. The control power on/off circuit 290 limits the power supply to the control signal generating unit 272 when receiving the state transition signal φ16. This can stop the balance correcting circuit 232 from operating.

In the present embodiment, when the state transition signal φ16 is at the "L" level, the control power on/off circuit 290 supplies power to the control signal generating unit 272. On the other hand, when the state transition signal φ16 is at the "H" level, the control power on/off circuit 290 limits the power supply to the control signal generating unit 272.

The control power on/off circuit 290 includes a signal input terminal 292, a switching device 294, a resistance 296, and diode 297. The signal input terminal 292 is configured to receive the state transition signal φ16. The signal input terminal 292 may be an exemplary state transition signal input terminal.

The switching device 294 is electrically connected between the positive end of the electricity storage cell 222 and the control signal generating unit 272. The switching device 294 limits the power supply to the control signal generating unit 272 in accordance with the state transition signal φ16. The switching device 294 may be a transistor such as a MOSFET and a bipolar junction transistor. The switching device 294 may be a PNP bipolar junction transistor. The switching device 294 may be an exemplary third switching device.

The resistance 296 may be electrically connected between the switching device 294 and the signal input terminal 292. When the switching device 294 is a bipolar junction transistor, the resistance 296 may be electrically connected between the base of the switching device 294 and the signal input terminal 292. The diode 297 may be electrically connected between the signal input terminal 292 and the resistance 296.

Figure 3:
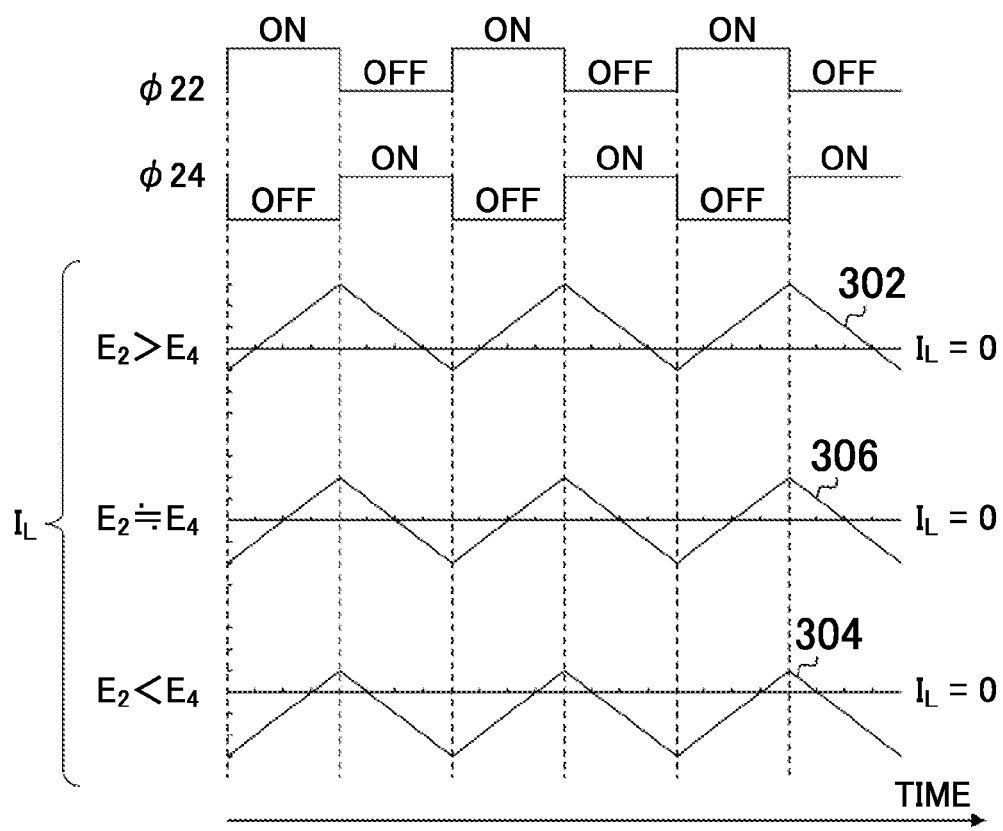
FIG. 3 schematically illustrates, as an example, how the electricity storage system 210 operates.

FIG. 3 schematically illustrates, as an example, how the electricity storage system 210 operates. In FIG. 3, graphs 302, 304 and 306 are shown in association with exemplary waveforms of the control signals φ22 and φ24. In the graphs 302, 304 and 306, the horizontal axis represents the time. The vertical axis represents the value of the inductor current $I_L$. In FIG. 3, the positive value of the inductor current $I_L$ means that the inductor current $I_L$ is flowing in the direction from the connection point 263 to the connection point 243 (indicated by the solid arrow in FIG. 2).

The graph 302 schematically illustrates an exemplary change over time of the inductor current $I_L$ when the voltage $E_2$ of the electricity storage cell 222 is higher than the voltage $E_4$ of the electricity storage cell 224. The graph 304 schematically illustrates an exemplary change over time of the inductor current $I_L$ when the voltage $E_2$ of the electricity storage cell 222 is lower than the voltage $E_4$ of the electricity storage cell 224. The graph 306 schematically illustrates an exemplary change over time of the inductor current $I_L$ when the voltage $E_2$ of the electricity storage cell 222 is substantially the same as the voltage $E_4$ of the electricity storage cell 224.

In FIG. 3, the control signals φ22 and φ24 are square waves having a duty cycle of 50%. As shown in FIG. 3, the control signals φ22 and φ24 have complementary logics or phases or polarities in such a manner that one of the switching devices 252 and 254 stays turned on while the other stays turned off.

As shown in the graph 302, when the voltage $E_2$ of the electricity storage cell 222 is higher than the voltage $E_4$ of the electricity storage cell 224, the current flow along the current path of the positive end of the electricity storage cell 222 to the switching device 252 to the connection point 263 to the inductor 250 to the connection point 243 to the negative end of the electricity storage cell 222 while the switching device 252 stays turned on. In this case, the inductor 250 is charged with the inductor current Il in the direction shown by the solid arrow in FIG. 2.

Subsequently, when the switching device 252 is turned off and the switching device 254 is turned on, the inductor current $I_L$ that has been charged in the inductor 250 is discharged along the current path of one end of the inductor 250 to the connection point 243 to the electricity storage cell 224 to the switching device 254 to the connection point 263 to the other end of the inductor 250. This discharge charges the electricity storage cell 224. As shown in FIG. 3, the inductor current $I_L$ decreases as the time elapses due to the discharge. Once the discharging current reaches zero, the charging current stars to flow through the inductor 250 in the opposite direction to the discharging current.

As shown in the graph 304, when the voltage $E_2$ of the electricity storage cell 222 is lower than the voltage $E_4$ of the electricity storage cell 224, the current flows along the current path of the positive end of the electricity storage cell 224 to the connection point 243 to the inductor 250 to the connection point 263 to the switching device 254 to the negative end of the electricity storage cell 224 while the switching device 254 stays turned on. In this case, the inductor 250 is charged with the inductor current $I_L$ flowing in the direction shown by the dotted arrow in FIG. 2.

Subsequently, when the switching device 254 is turned off and the switching device 252 is turned on, the inductor current Il that has been charged in the inductor 250 is discharged along the current path of the other end of the inductor 250 to the connection point 263 to the switching device 252 to the electricity storage cell 222 to the connection point 243 to one end of the inductor 250. This discharge charges the electricity storage cell 222.

As described above, the electricity storage cells 122 and 124 can exchange electric energy via the inductor 250 if the balance correcting circuit 232 provides a current alternately to the first open/close circuit and to the second open/close circuit. Thus, the voltages of the electricity storage cells 122 and 124 can be equalized.

As shown in the graph 306, when the voltage $E_2$ of the electricity storage cell 222 is substantially the same as the voltage $E_4$ of the electricity storage cell 224, the discharge and charge of the inductor current $I_L$ are performed substantially equally while the switching device 252 or 254 remains turned on. Thus, a balance can be substantially maintained between the voltages.

Here, as a electricity storage cell degrades, the electricity storage cell experiences a battery voltage drop within a shorter discharge duration. Therefore, while the electricity storage system 210 is in the discharging state, a degraded electricity storage cell is more likely to experience a battery voltage. On the other hand, as a electricity storage cell degrades, the internal resistance of the electricity storage cell increases. Thus, if the electricity storage system 210 transitions to the charging state while there is a difference in voltage between a normal electricity storage cell and a degraded electricity storage cell, the voltage drop in the degraded electricity storage cell is larger than the voltage drop in the normal electricity storage cell depending on the value of the charging current.

As a result, the battery voltage of the degraded electricity storage cell is apparently higher than the battery voltage of the normal electricity storage cell even though the electric energy that is actually stored in the degraded electricity storage cell is smaller. If the balance correcting circuit 232 is operated under this situation, charges are moved from the degraded electricity storage cell to the normal electricity storage cell.

To address this issue, in the balance correcting circuit 232 relating to the present embodiment, when the signal input terminal 292 receives the state transition signal φ16 and the base voltage of the switching device 294 becomes higher than a predetermined value, the switching device 294 limits the power supply to the control signal generating unit 272. In this manner, the balance correcting circuit 232 can be stopped from operating.

In the present embodiment, to simplify the description, the control signals φ22 and φ24 are assumed to have a duty cycle of 50%. However, the control signals φ22 and φ24 are not limited to such. The duty cycle of the control signals φ22 and φ24 may be changed according to the voltage difference between the electricity storage cells 222 and 224.

FIG. 4 schematically illustrates an example of a electricity storage system 410. The electricity storage system 410 includes the terminal 212, the terminal 214, the electricity storage cells 222 and 224 that are connected in series, and a balance correcting circuit 432. The balance correcting circuit 432 may be an exemplary balance correcting apparatus.

The balance correcting circuit 432 equalizes the voltages of the electricity storage cells 222 and 224. The balance correcting circuit 432 includes the inductor 250, the switching device 252, the switching device 254, the control signal generating unit 272, the diode 282, the diode 284, and a control power on/off circuit 490.

The balance correcting circuit 432 is different from the balance correcting circuit 232 in that the control power on/off circuit 490 is arranged between the negative end of the electricity storage cell 224 and the control signal generating unit 272. In the present embodiment, when the state transition signal φ16 is at the "H" level, the control power on/off circuit 490 supplies power to the control signal generating unit 272. On the other hand, when the state transition signal φ16 is at the "L" level, the control power on/off circuit 290 limits the power supply to the control signal generating unit 272. Except for the above-described features, the balance correcting circuit 432 may have a similar configuration to the balance correcting circuit 232.

The constituents of the balance correcting circuit 432 that are the same or similar to the corresponding constituents of the balance correcting circuit 232 are assigned with the identical reference numerals and not explained here. The electricity storage system 110 may have a similar configuration as the electricity storage system 410. The balance correcting circuits 132, 134 and 136 may have similar configurations to the balance correcting circuit 432.

The control power on/off circuit 490 includes the signal input terminal 292, a switching device 494, the resistance 296, and the diode 297. The switching device 494 is electrically connected between the negative end of the electricity storage cell 224 and the control signal generating unit 272. The switching device 494 limits the power supply to the control signal generating unit 272 in accordance with the state transition signal φ16.

The switching device 494 may be a transistor such as a MOSFET and a bipolar junction transistor. The switching device 494 may be an NPN bipolar junction transistor. The switching device 494 may be an exemplary third switching device.

Figure 5:
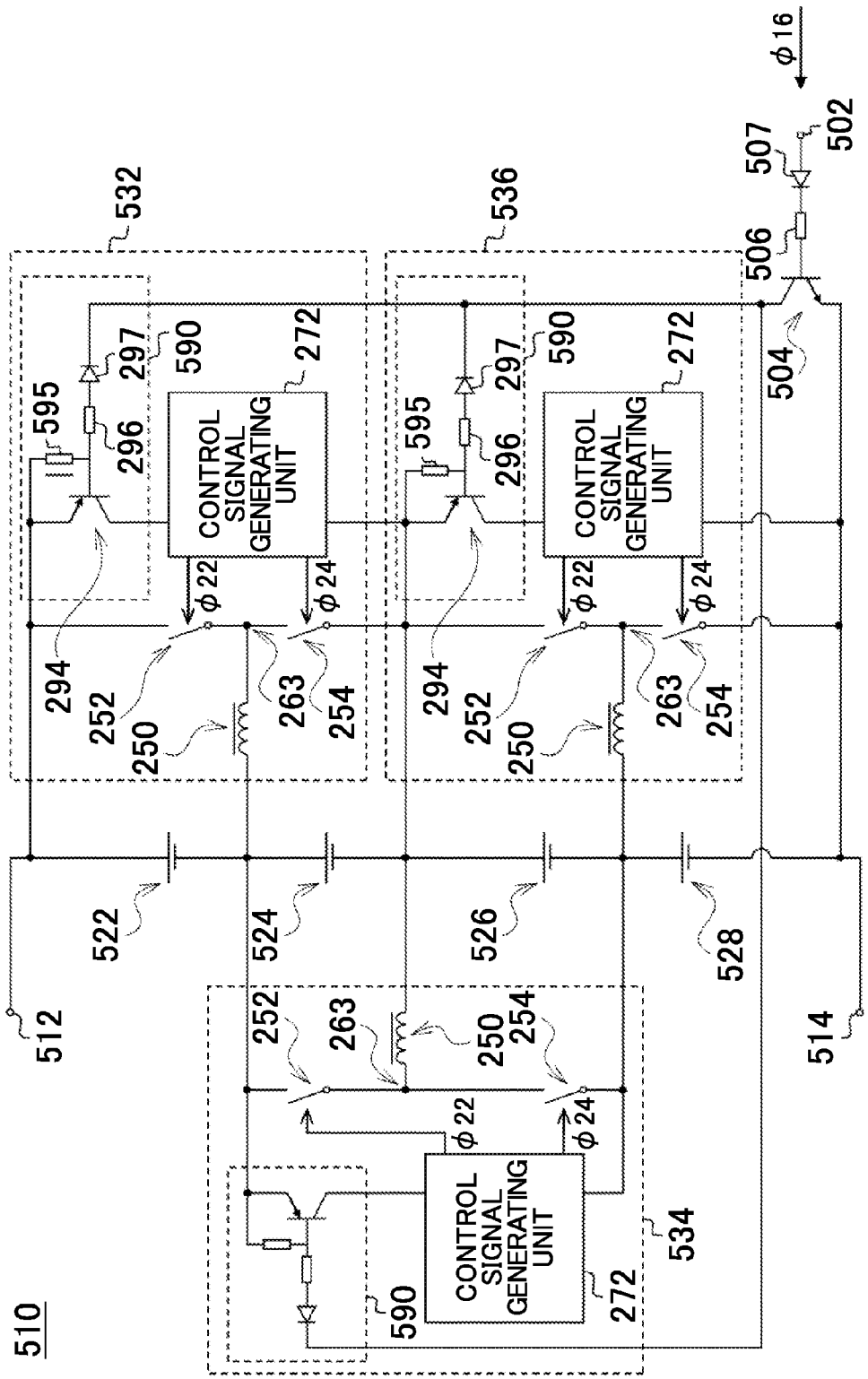
FIG. 5 schematically illustrates an example of an electricity storage system 510.

FIG. 5 schematically illustrates an example of a electricity storage system 510. The electricity storage system 510 includes a signal input terminal 502, a switching device 504, a resistance 506, a diode 507, a terminal 512, a terminal 514, a electricity storage cell 522, a electricity storage cell 524, a electricity storage cell 526, a electricity storage cell 528, a balance correcting circuit 532, a balance correcting circuit 534, and a balance correcting circuit 536. The balance correcting circuits 532, 534 and 536 may be an exemplary balance correcting apparatus.

The terminal 512 may have a similar configuration as the terminal 112 or 212. The terminal 514 may have a similar configuration as the terminal 114 or 214. The electricity storage cells 522, 524, 526 and 528 may each have a similar configuration as the electricity storage cell 122, 124, 126, 128, 222 or 224.

The electricity storage system 510 is different from the electricity storage systems 210 and 410 in that the signal input terminal 502, the switching device 504, the resistance 506 and the diode 507 are included. The balance correcting circuits 532, 534 and 536 are different from the balance correcting circuits 232 and 432 in that the control power on/off circuit 590 is included. Except for the above, the balance correcting circuits 532, 534 and 536 may have a similar configuration to the balance correcting circuit 232. The constituents of the balance correcting circuits 532, 534 and 536 that are the same or similar to the corresponding constituents of the balance correcting circuit 232 are assigned with the same reference numerals and are not explained here.

The electricity storage systems 110, 210 and 410 may have a similar configuration to the electricity storage system 510. The balance correcting circuits 132, 134 and 136 may have similar configurations as the balance correcting circuit 532. The control power on/off circuits 290 and 490 may have similar configurations as the control power on/off circuit 590.

In the present embodiment, the diodes 282 and 284 are omitted from the balance correcting circuits 532, 534 and 536 to simplify the description. However, the balance correcting circuits 532, 534 and 536 may have the diodes 282 and 284 as in the balance correcting circuit 232.

The signal input terminal 502 receives the state transition signal φ16. The signal input terminal 502 may be an exemplary state transition signal input terminal.

The switching device 504 limits the power supply to the control signal generating unit 272 in accordance with the state transition signal φ16. The switching device 504 may be electrically connected to the control power on/off circuit 590 and to the terminal 512 or 514. The switching device 504 may be a transistor such as a MOSFET and a bipolar junction transistor.

In the present embodiment, the switching device 504 is an NPN bipolar junction transistor and electrically connected to the terminal 514. In other words, the switching device 504 is electrically connected between the negative end of the electricity storage cell 528 and the control power on/off circuit 590 of each of the balance correcting circuits 532, 534 and 536.

In this way, while the state transition signal φ16 is at the "H" level, the switching device 504 remains turned on. On the other hand, while the state transition signal φ16 is at the "L" level, the switching device 504 remains turned off. When the switching device 504 is turned on, the switching devices 294 of the balance correcting circuits 534 and 536 are also turned on, so that the control power on/off circuit 590 supplies power to the control signal generating unit 272. On the other hand, when the switching device 504 is turned off, the switching devices 294 of the balance correcting circuits 534 and 536 are also turned off, so that the control power on/off circuit 590 limits the power supply to the control signal generating unit 272.

The resistance 506 may be electrically connected between the signal input terminal 502 and the switching device 504. When the switching device 504 is a bipolar junction transistor, the resistance 506 may be electrically connected between the base of the switching device 504 and the signal input terminal 502. The diode 507 may be electrically connected between the signal input terminal 502 and the resistance 506.

The control power on/off circuit 590 includes the switching device 294, the resistance 296, the diode 297, and a resistance 595. The resistance 595 may be an exemplary second resistance element.

In the present embodiment, the switching device 294 is a PNP bipolar junction transistor, and one end of the resistance 595 is electrically connected between the base of the switching device 294 and the resistance 296. The other end of the resistance 595 is electrically connected between the positive end of the electricity storage cell 522 and the switching device 294.

The value of the base current of the switching device 294 can be controlled to fall within an appropriate range by adjusting the resistance values of the resistances 296 and 595. In this way, even when the electricity storage system 510 includes a plurality of balance correcting circuits, a single state transition signal φ16 can be used to control the plurality of balance correcting circuits.

When the switching device 294 is an NPN bipolar junction transistor, one end of the resistance 595 may be electrically connected between the base of the switching device 294 and the resistance 296. The other end of the resistance 595 may be electrically connected between the positive end of the electricity storage cell 522 and the switching device 294.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

100 apparatus, 102 motor, 104 braking signal generator, 106 state transition signal generator, 110 electricity storage system, 112 terminal, 114 terminal, 122 electricity storage cell, 124 electricity storage cell, 126 electricity storage cell, 128 electricity storage cell, 132 balance correcting circuit, 134 balance correcting circuit, 136 balance correcting circuit, 143 connection point, 145 connection point, 147 connection point, 210 electricity storage system, 212 terminal, 214 terminal, 222 electricity storage cell, 224 electricity storage cell, 232 balance correcting circuit, 243 connection point, 250 inductor, 252 switching device, 254 switching device, 263 connection point, 272 control signal generating unit, 282 diode, 284 diode, 290 control power on/off circuit, 292 signal input terminal, 294 switching device, 296 resistance, 297 diode, 302 graph, 304 graph, 306 graph, 410 electricity storage system, 432 balance correcting circuit, 490 control power on/off circuit, 494 switching device, 502 signal input terminal, 504 switching device, 506 resistance, 507 diode, 510 electricity storage system, 512 terminal, 514 terminal, 522 electricity storage cell, 524 electricity storage cell, 526 electricity storage cell, 528 electricity storage cell, 532 balance correcting circuit, 534 balance correcting circuit, 536 balance correcting circuit, 590 control power on/off circuit, 595 resistance

What is claimed is:

1. An apparatus for use in an electricity storage system including a first electricity storage cell and a second electricity storage cell connected in series, the apparatus comprising:
   a state transition signal generator that generates a state transition signal indicating that the electricity storage system transitions to and temporarily stays in a charging state while the electricity storage system is operating; and a balance correcting apparatus that equalizes voltages of the first electricity storage cell and the second electricity storage cell, the balance correcting apparatus comprising:
an inductor having one end that is electrically connected to a connection point between one end of the first electricity storage cell and one end of the second electricity storage cell;
a first switching device that is electrically connected between the other end of the inductor and the other end of the first electricity storage cell;
a second switching device that is electrically connected between the other end of the inductor and the other end of the second electricity storage cell; and
a control signal generating unit that supplies, to the first switching device and the second switching device, a control signal for controlling an ON-OFF operation of the first switching device and the second switching device to allow the first switching device and the second switching device to perform an ON-OFF operation alternately, wherein
the control signal generating unit stops generating the control signal when receiving the state transition signal generated by the state transition signal generator.

2. A balance correcting apparatus that equalizes voltages of a first electricity storage cell and a second electricity storage cell that are connected in series in an electricity storage system, the balance correcting apparatus comprising:
an inductor having one end that is electrically connected to a connection point between one end of the first electricity storage cell and one end of the second electricity storage cell;
a first switching device that is electrically connected between the other end of the inductor and the other end of the first electricity storage cell;
a second switching device that is electrically connected between the other end of the inductor and the other end of the second electricity storage cell; and
a control signal generating unit that supplies, to the first switching device and the second switching device, a control signal for controlling an ON-OFF operation of the first switching device and the second switching device to allow the first switching device and the second switching device to perform an ON-OFF operation alternately, wherein
the control signal generating unit stops generating the control signal when receiving a state transition signal indicating that the electricity storage system transitions to and temporarily stays in a charging state while the electricity storage system is operating, and
the balance correcting apparatus further comprises a third switching device that is electrically connected between the other end of the first electricity storage cell or the other end of the second electricity storage cell and the control signal generating unit, the third switching device limiting power supply to the control signal generating unit in accordance with the state transition signal.

3. The balance correcting apparatus according to claim 2, wherein
the third switching device is a bipolar junction transistor, and
the balance correcting apparatus further comprises:
a state transition signal input terminal that receives the state transition signal;
a first resistance element that is electrically connected between a base of the bipolar junction transistor and the state transition signal input terminal; and
a second resistance element having one end that is electrically connected between the base of the bipolar junction transistor and the first resistance element and the other end that is electrically connected between the other end of the first electricity storage cell or the other end of the second electricity storage cell and the third switching device.

4. An electricity storage system comprising:
a first electricity storage cell and a second electricity storage cell that are connected in series; and
the balance correcting apparatus according to claim 2, the balance correcting apparatus equalizing voltages of the first electricity storage cell and the second electricity storage cell.

5. A transportation device comprising:
the electricity storage system according to claim 4;
a motor that is electrically connected to the electricity storage system, the motor converting at least one of kinetic energy of the transportation device and a potential energy of the transportation device into electric energy when the transportation device is applied with a brake;
a braking signal generator that generates a braking signal indicating that the transportation device is to be applied with a brake or that the transportation device is being applied with a brake; and
a state transition signal generator that notifies the state transition signal to the balance correcting apparatus when the braking signal is received.

6. The apparatus according to claim 1, further comprising
a third switching device that is electrically connected between the other end of the first electricity storage cell or the other end of the second electricity storage cell and the control signal generating unit, the third switching device limiting power supply to the control signal generating unit in accordance with the state transition signal.

7. The apparatus according to claim 6, wherein
the third switching device is a bipolar junction transistor, and
the apparatus further comprises:
a state transition signal input terminal that receives the state transition signal generated by the state transition signal generator;
a first resistance element that is electrically connected between a base of the bipolar junction transistor and the state transition signal input terminal; and
a second resistance element having one end that is electrically connected between the base of the bipolar junction transistor and the first resistance element and the other end that is electrically connected between the other end of the first electricity storage cell or the other end of the second electricity storage cell and the third switching device.

8. An electricity storage system comprising:
a first electricity storage cell and a second electricity storage cell that are connected in series; and
the apparatus according to claim 1, the apparatus equalizing voltages of the first electricity storage cell and the second electricity storage cell.

9. A transportation device comprising:
the electricity storage system according to claim 8;
a motor that is electrically connected to the electricity storage system, the motor converting at least one of kinetic energy of the transportation device and a potential energy of the transportation device into electric energy when the transportation device is applied with a brake; and a braking signal generator that generates a braking signal indicating that the transportation device is to be applied with a brake or that the transportation device is being applied with a brake, wherein the state transition signal generator generates the state transition signal when the braking signal is received.

* * * * *